(12) United States Patent
Vernica et al.

(10) Patent No.: US 10,102,185 B2
(45) Date of Patent: Oct. 16, 2018

(54) DIGITAL DOCUMENT INCLUDING REFERENCE PAGE NUMBERS AND FRACTIONAL PAGE NUMBERS

(71) Applicant: Hewlett-Packard Development Company, L.P., Fort Collins, CO (US)

(72) Inventors: Rares Vernica, Palo Alto, CA (US); Steven J Simske, Ft. Collins, CO (US); Shanchan Wu, Palo Alto, CA (US); Jerry Liu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 64 days.

(21) Appl. No.: 15/307,354

(22) PCT Filed: Apr. 30, 2014

(86) PCT No.: PCT/US2014/036228
§ 371 (c)(1),
(2) Date: Oct. 27, 2016

(87) PCT Pub. No.: WO2015/167555
PCT Pub. Date: Nov. 5, 2015

(65) Prior Publication Data
US 2017/0052928 A1  Feb. 23, 2017

(51) Int. Cl.
*G06F 17/00* (2006.01)
*G06F 17/21* (2006.01)
*G06F 3/147* (2006.01)

(52) U.S. Cl.
CPC ............ *G06F 17/217* (2013.01); *G06F 3/147* (2013.01); *G09G 2340/145* (2013.01); *G09G 2350/00* (2013.01); *G09G 2380/14* (2013.01)

(58) Field of Classification Search
CPC .................................................. G06F 17/217
See application file for complete search history.

(56) References Cited

U.S. PATENT DOCUMENTS 5,737,599 A * 4/1998 Rowe ..................... G06F 17/211
7,281,209 B2 * 10/2007 Nara ..................... G06F 17/217
358/1.11

(Continued)

FOREIGN PATENT DOCUMENTS

JP  2006293598 A  10/2006
JP  2008123528 A  5/2008

OTHER PUBLICATIONS

Makris, A Special Purpose Computer for High-Speed Page Composition, Proceedings, Fall Joint Computer Conference, 1966, p. 137-148.*

(Continued)

*Primary Examiner* — Amelia Tapp
(74) *Attorney, Agent, or Firm* — Dicke Billig & Czaja PLLC

(57) ABSTRACT

A device including a processor and a memory communicatively coupled to the processor is provided. The memory stores instructions causing the processor, after execution of the instructions by the processor, to: display a reference page number with each displayed page of a digital document having reference page numbers, the digital document corresponding to a reference document having page numbers that correspond to the reference page numbers; and display a fractional page number with each displayed page of the digital document, each fractional page number corresponding to a portion of a page of the reference document.

20 Claims, 4 Drawing Sheets

(56) References Cited

U.S. PATENT DOCUMENTS

| | | |
|---|---|---|
| 7,350,143 B2 | 3/2008 | Elazar et al. |
| 7,865,817 B2 | 1/2011 | Ryan et al. |
| 9,928,218 B2* | 3/2018 | Cranfill ................. G06F 17/214 |
| 2004/0019854 A1* | 1/2004 | Nguyen ................. G06F 17/211 |
| | | 715/251 |
| 2006/0206791 A1* | 9/2006 | Komamura ............. G06F 3/038 |
| | | 715/205 |
| 2010/0128293 A1 | 5/2010 | Tomita et al. |
| 2012/0198330 A1 | 8/2012 | Koppel et al. |
| 2013/0132888 A1 | 5/2013 | Tijssen |
| 2013/0139052 A1 | 5/2013 | Rong et al. |
| 2013/0258419 A1 | 10/2013 | Shimazu |

OTHER PUBLICATIONS

Hirata et al., "Comics image processing: learning to segment text," MANPU '16, Dec. 2016, 6 pages.*
Charlie Sorrel, "Amazon Adds Real Page Numbers to Kindle", Aug. 2, 2011 2 pages.

* cited by examiner

DIGITAL DOCUMENT INCLUDING REFERENCE PAGE NUMBERS AND FRACTIONAL PAGE NUMBERS

BACKGROUND

Digital documents, such as electronic books, can be read on a variety o computing devices, such as electronic book readers, smartphones, tablets, laptop computers, and desktop computers. The digital devices have different screen sizes, form factors, window sizes and resolutions.

DETAILED DESCRIPTION

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description. Therefore, is not to be taken in a limiting sense, and the scope of the present disclosure is defined by the appended claims. It is to be understood that features of the various examples described herein may be combined, in part or whole, with each other, unless specifically noted otherwise.

Digital documents comprise a large percentage of the content used today. There is an inconsistency, however, between the page numbers of a printed physical copy of a document, such as a book, and the implicit or explicit page numbers for a digital version of the document, such as an electronic book. This is due to the large variety of screen sizes, form factors, windows sizes, and resolutions, which provide an infinite number of possible renderings for the digital version of the document.

Accordingly, a page numbering system for digital documents, which have corresponding reference documents, is disclosed. The page numbering system for the digital documents is consistent with the reference documents to enable easy referencing between the digital documents and the reference documents. The system includes reference page numbers embedded within the digital document that correspond to the page numbers of the reference document. In addition to the reference page numbers. The digital document also includes fractional page numbers. The fractional page numbers indicate which portions of a page of the reference document correspond to a page of the digital document. In this way, various renderings of a digital document can be easily referenced to the reference document despite variations in screen sizes, form factors, window sizes, or resolutions.

Figure 1:
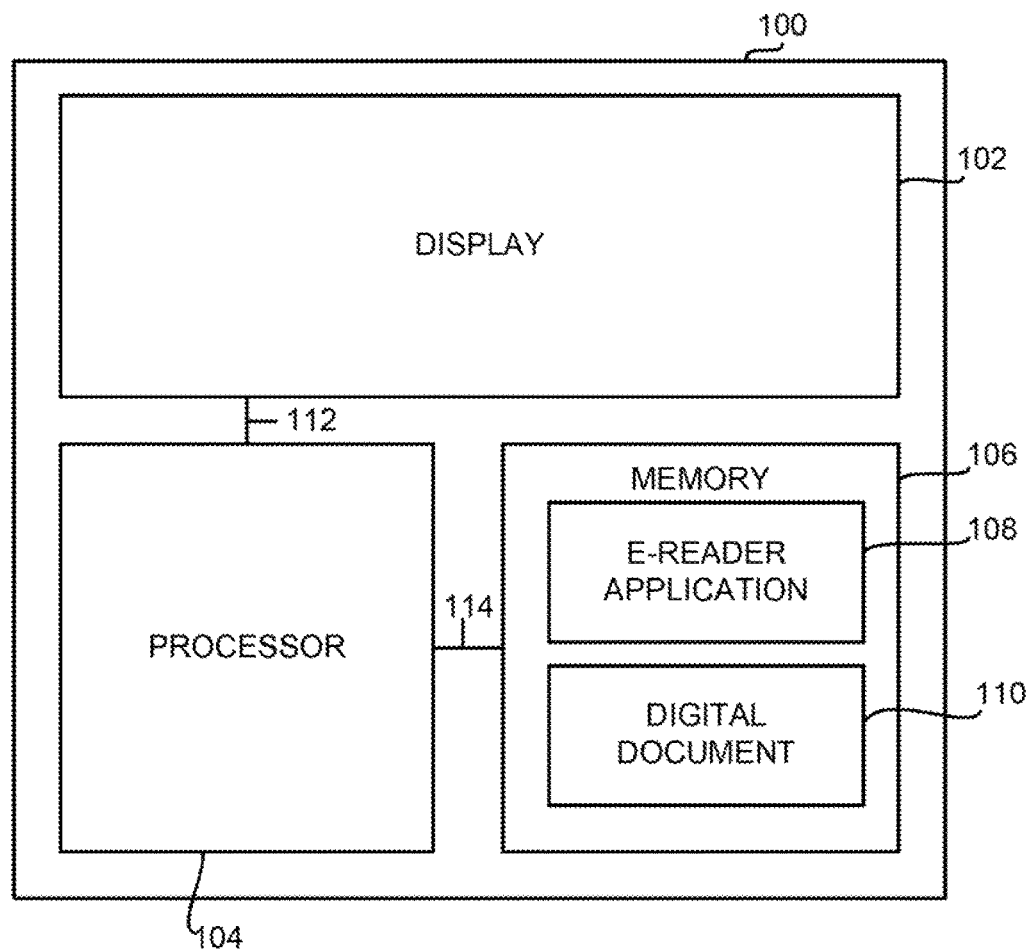
FIG. 1 illustrates one example of a processing system for implementing a page numbering system for a digital document having a corresponding reference document.

FIG. 1 illustrates one example of a processing system 100 for implementing a page numbering system for a digital document having a corresponding reference document. Processing system 100 includes a display 102, a processor 104, and a memory 106. Display 102 is communicatively coupled to processor 104 through a communication link 112. Processor 104 is communicatively coupled to memory 106 through a communication link 114. Processing system 100 is an electronic book reader, smartphone, tablet, laptop computer, desktop computer, or other suitable computing device.

Processor 104 includes a Central Processing Unit (CPU) or another suitable processor. In one example, memory 106 stores machine readable instructions executed by processor 104 for operating processing system 100 Memory 106 includes any suitable combination of volatile and/or non-volatile memory, such as combinations of Random Access Memory (RAM), Read-Only Memory (ROM), flash memory, and/or other suitable memory.

Memory 106 stores instructions to be executed by processor 104 including instructions for an electronic reader (e-reader) application 108. Memory 106 also stores a digital document 110 to be rendered on display 102 by processor 104 executing instructions of e-reader application 108. E-reader application 103 renders digital document 110 based on the characteristics of display 102, such as the screen size, form factor, window size, and/or resolution. Each page of the rendered digital document is assigned a reference page number and a fractional page number, which are displayed with each rendered page. As will be described in more detail below, each reference page number corresponds to a page number of the reference document, and each fractional page number corresponds to a portion of a page of the reference document. The reference page numbers and fractional page numbers may be used for directly navigating to a specific portion of the digital document.

Figure 2:
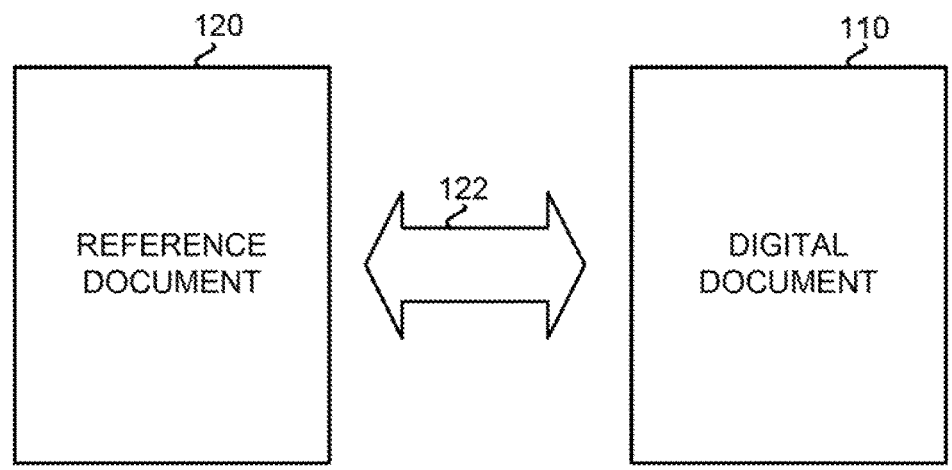
FIG. 2 illustrates one example of a reference document corresponding to a digital document.

FIG. 2 illustrates one example of a reference document 120 corresponding to a digital document 110 as indicated by 122. Reference document 120 is a physical book or other suitable document having predefined page numbers. Digital document 110 includes embedded reference page numbers that correspond to (i.e., equal) the page numbers of reference document 120. Therefore, in one example. The content of each page of reference document 120 having a predefined page number corresponds (i.e., matches) the content of digital document 110 having a reference page number equal to the predefined page number. In other examples, digital document 110 may include additional content not found in reference document 120. In this case. The content of reference document 120 having a predefined page number is included in the content of digital document 110 having a reference page number equal to the predefined page number.

Figure 3:
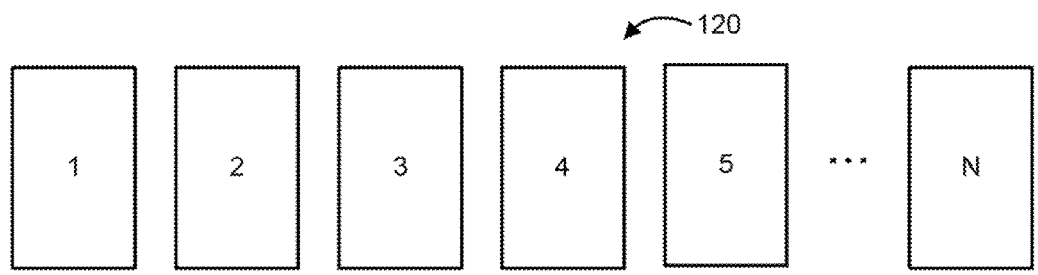
FIG. 3 illustrates one example of page numbering for a reference document.

FIG. 3 illustrates one example of page numbering for a reference document 120. Reference document 120 includes pages 1 to N, where "N" is the last page of the document. Each page of reference document 120 has a predefined whole number page number. Reference document 120 may be a physical book or other suitable document. Each page of reference document 120 may be filled with content or include blank space. For example. The last page of a chapter may include content in an upper portion of the page and blank space in the lower portion of the page. The first page of a chapter may include blank space in an upper portion of the page and content in the lower portion of the page. In other examples, entire pages of the reference document may be blank.

Figure 4A:
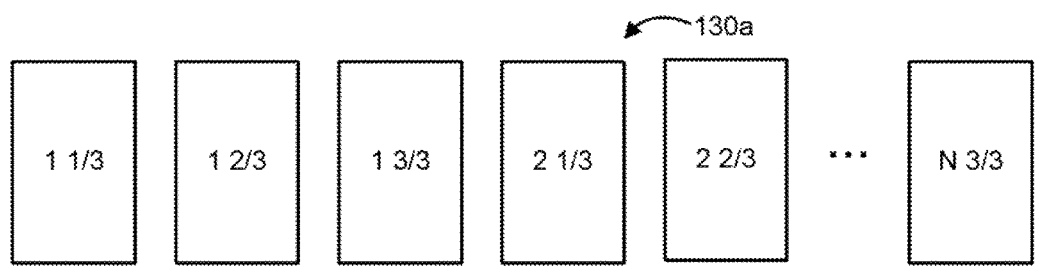
FIGS. 4A-4C illustrate examples of page numbering for a digital document corresponding to a reference document.

FIG. 4A illustrates one example of page numbering for a digital document 130a corresponding to reference document 120. Each page of digital document 130a as rendered on a display, such as display 102 previously described and illustrated with reference to FIG. 1, includes a reference page number and a fractional page number. The reference page numbers are whole numbers that correspond to (i.e., equal) the page numbers of the reference document. In this example, each page of the reference document corresponds to three pages of the rendered digital document. Therefore, three pages of the rendered digital document have the same reference page number. For example, the first three pages of digital document 130a are assigned the reference page number "1".

Each fractional page number includes a denominator indicating the number of pages of the digital document corresponding to a single page of the reference document. Since in this example, each page of the reference document corresponds to three pages of the rendered digital document, the denominator equals three. The numerator of each fractional page number indicates the portion of the page of the reference document. Accordingly, in this example, digital document pages 1 ⅓, 1 ⅔, and 1 /3;3 correspond to page 1 of the reference document, digital document pages 2 ⅓, 2 ⅔, and 2 /3;3 correspond to page 2 of the reference document, . . . and digital document pages N ⅓, N ⅔, and N/3;3 correspond to the last page of the reference document. In this way, each page of the digital document can be easily referenced to the reference document. For example, page 2 ⅔ of the digital document includes the content in the center portion of page 2 of the reference document.

Figure 4B:
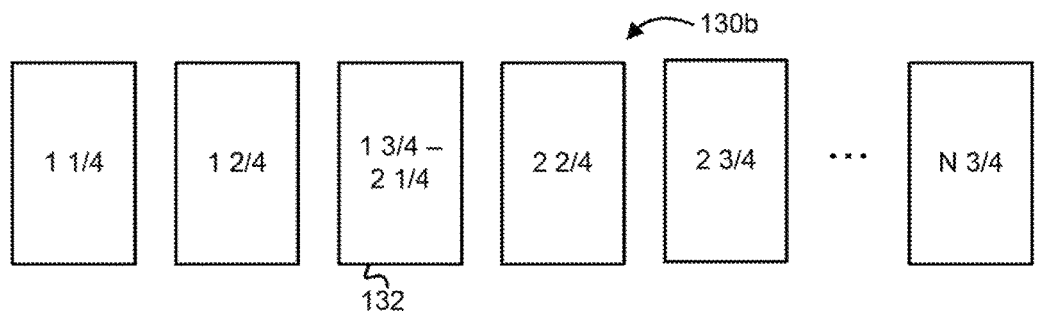

FIG. 4B illustrates another example of page numbering for a digital document 130b corresponding to reference document 120. In this example, each page of the reference document corresponds to four pages of the rendered digital document, thus the denominator of each fractional page number equals four. Digital document 130b includes a page indicated at 132 that includes content from two pages of reference document 120. For this case, a range of reference page numbers and fractional page numbers are assigned to the page. The page indicated at 132 has page number 1 ¾ 2 ¼, such that the content of the page includes content from the bottom of page 1 of the reference document and the top of page 2 of the reference document. While "-" is used as the span indicator in FIG. 4B, the span indicator may include any suitable word or symbol, such as "to" or " . . . ".

Figure 4C:
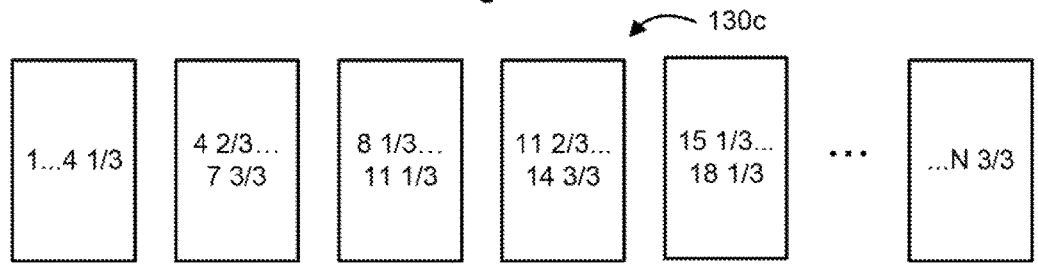

FIG. 4C illustrates another example of page numbering for a digital document 130c corresponding to reference document 120. In this example, multiple pages of the reference document correspond to each page of the rendered digital document. Therefore, a range of reference page numbers and fractional page numbers is assigned to each page of the digital document. Accordingly, in this example, the digital document has page 1 . . . 4 ⅓ corresponding to page 1 through the top portion of page 4 of the reference document, page 4 ⅔ . . . 7 /3;3 corresponding to the center and bottom portion of page 4 through the entire page 7 of the reference document, etc.

Figure 5:
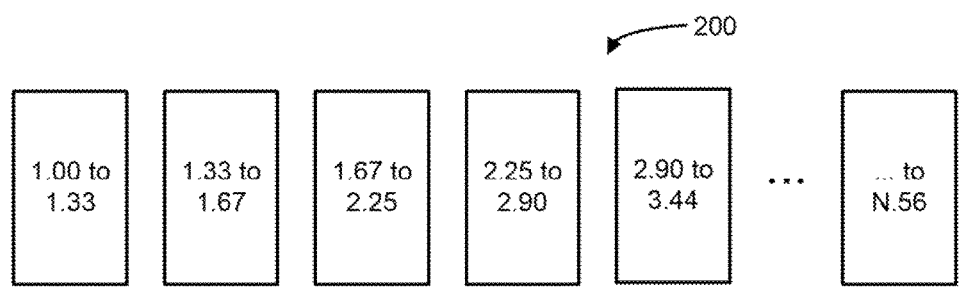
FIG. 5 illustrates another example of page numbering for a digital document corresponding to a reference document.

FIG. 5 illustrates another example of page numbering for a digital document 200 corresponding to a reference document 120. In this example, a decimal representation is used for the fractional page number and each page of the rendered digital document is assigned a range of reference page numbers and fractional page numbers. Each fractional page number in decimal representation identifies a percentage of each page of the rendered digital document corresponding to a page of the reference document.

The decimal representation may be based on a count of characters for text and an area for non-text objects, such as images, videos, and/or other objects. Each character and object has an index, which may be computed by the processing system during rendering of the digital document or may be embedded in the digital document along with the reference page numbers. For example, consider content of a digital document assigned a reference page number and having two images, 2400 characters of text, and two video links. In the digital document the video links each take up 0.05 (i.e. 5%) of the referenced page, one of the images takes up 0.12 (i.e., 12%) of the referenced page. The other image takes up 0.13 (i.e., 13%) of the referenced page, and the text takes up 0.65 (i.e., 65%) of the referenced page.

Therefore, any transition between pages of the rendered digital document can be identified by a (reference page number).(fractional page number) location. For example, if the rendered digital page ends after 0.34 of text. The 0.12 image, and the two video links. Then this marks (reference page number) 0.56 as the transition point. In the example illustrated in FIG. 5. The rendered digital document has page 1.00 to 1.33 corresponding to the top portion of page 1 of the reference document, page 1.33 to 1.67 corresponding to the middle portion of page 1 of the reference document, page 1.67 to 2.25 corresponding to the lower portion of page 1 through the upper portion of page 2 of the reference document, etc.

In one example, the content of a rendered digital document may be reordered to accommodate differences in form factor (e.g., size, and/or aspect ratio) of various displays on which the digital document may be rendered. In these cases, an e-reader can be used to navigate the content in the right order in spite of differences in the ordering of the rendered content.

Figure 6:
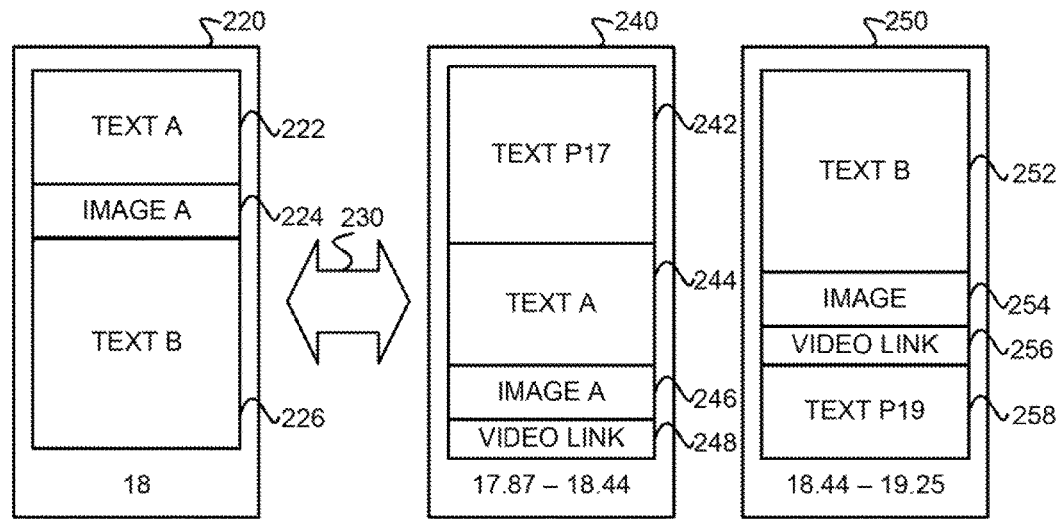
FIG. 6 illustrates one example of one page of a reference document corresponding to two digital pages.

FIG. 6 illustrates one example of one page of a reference document, indicated at 220, corresponding, as indicated at 230, to two pages of a rendered digital document, as indicated at 240 and 250. The page of the reference document indicated at 220 has a predefined page number of 18 and includes the content "TEXT A" 222, "IMAGE A" 224, and "TEXT B" 226. The "TEXT A" 222 fills 0.32 of the page, "IMAGE A" 224 fills 0.12 of the page, and "TEXT B" 226 fills 0.56 of the page.

The corresponding pages of the rendered digital document as indicated at 240 and 250 include the corresponding content "TEXT A" 244, "IMAGE A" 246, and "TEXT B" 252 which match "TEXT A" 222, "IMAGE A" 224, and "TEXT B" 226, respectively. In addition. The digital document includes "TEXT P17" 242 corresponding to content from page 17 of the reference document, "TEXT P19" 258 corresponding to content from page 19 of the reference document, and "VIDEO LINK" 248, "VIDEO LINK" 256, and "IMAGE" 254 which are not in the reference document. Accordingly, in this example, the page of rendered digital document indicated at 240 includes the content "TEXT P17" 242, "TEXT A" 244, "IMAGE A" 246, and "VIDEO LINK" 248 and page number 17.87-18.44. The page of rendered digital document indicated at 250 includes the content "TEXT B" 252, "IMAGE" 254, "VIDEO LINK" 256, and "TEXT P19" 258 and page number 18.44-19.25.

The decimal representation of the fractional page numbers may also be used to provide content charges, such as printing charges. For example. To print pages 67.54 to 78.32, 10.78 total pages will be printed. If, in addition, 8.34 of these pages are text and the remainder are non-text objects, such as images, videos, and/or other objects, then the charge for printing may be: (Per Text Page Rate)*8.34+Per Image Page Rate)*2.44.

The decimal representation of the fractional page numbers may also be used to estimate bandwidth for sending an electronic form of the content. For example, if bandwidth of text and images can be estimated, then the expected bandwidth for the above example of pages 67.54 to 78.32 is: (Per Text Page Bandwidth)*8.34+(Per Image Page Bandwidth) *2.44.

The decimal representation of the fractional page numbers may also be used for content typing. Content typing can be estimated based on the percent of the pages of each data type: text, images, links, and other objects. The decimal representation of the fractional page numbers may also be used to provide a parallel representation of the content by text, image, or other object. This could be extended to having, for example. The decimal representation on an alternate printed version of the content. The decimal representation of the fractional page numbers may also be used for citations. In other examples. The decimal representation of the fractional page numbers can be used for other suitable applications.

Figure 7A:
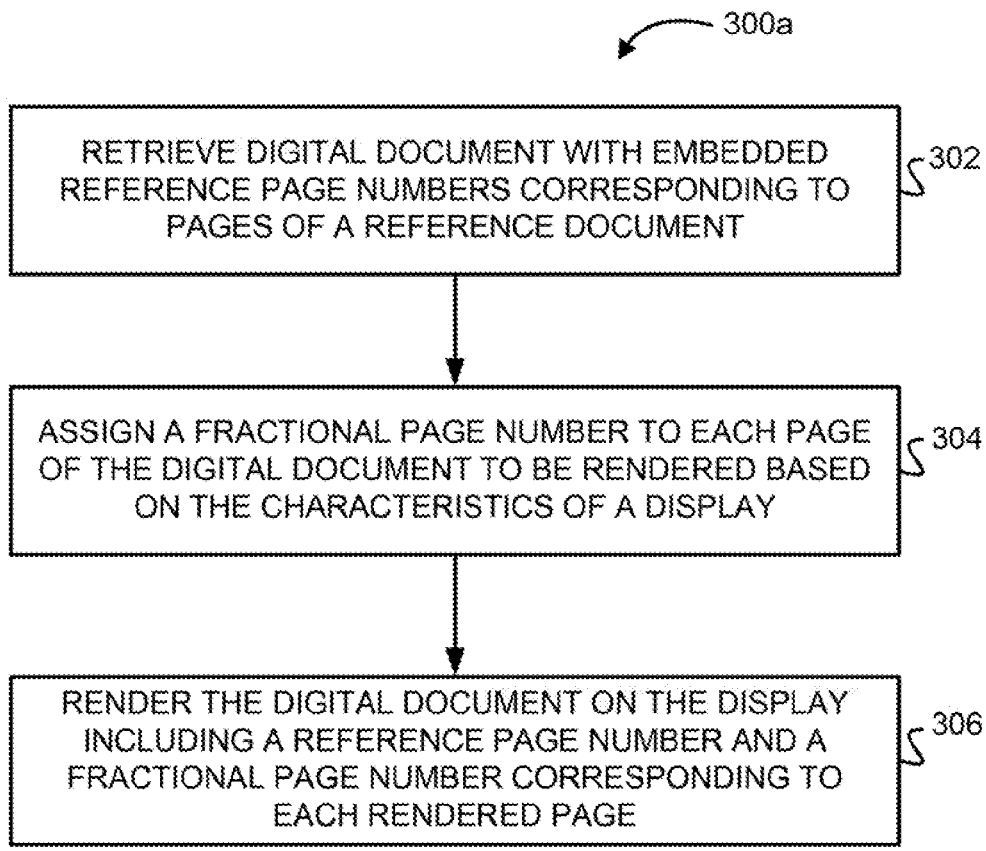
FIGS. 7A-7B illustrate one example of a method for assigning page numbers to a digital document corresponding to a reference document.

FIG. 7A illustrates one example of a method 300a for assigning page numbers to a digital document corresponding to a reference document. At 302, a digital document with embedded reference page numbers corresponding to pages of a reference document is retrieved. At 304, a fractional page number is assigned to each page of the digital document to be rendered based on the characteristics of a display on which the digital document is to be rendered. At 306. The digital document is rendered on the display including a reference page number and a fractional page number corresponding to each rendered page.

Figure 7B:
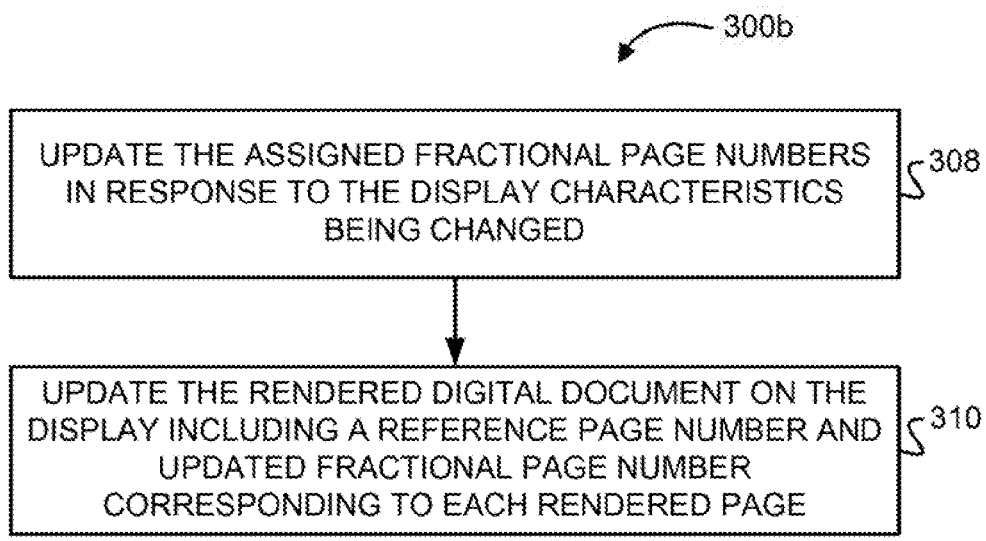

FIG. 7B illustrates one example of a method 300b for updating the assigned page numbers to a digital document corresponding to a reference document. At 308. The assigned fractional page numbers are updated in response to the display characteristics being changed. The display characteristics that may be changed include the window size, font size, line spacing, and/or other suitable characteristics that change the amount of content that can fit on the display. At 310, the rendered digital document is updated on the display including a reference page number and updated fractional page number corresponding to each rendered page.

Examples of the disclosure provide a page numbering system that enables referencing between digital and physical versions of the same content. The system can be applied to rendering the digital content on various screen sizes, form factors, window sizes, or resolutions. The system can be applied when content from multiple physical pages correspond to a digital page and when content from multiple digital pages corresponds to a physical page. Using this system, strong references can be made between the physical pages and the digital pages.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A device comprising:
a display;
a processor; and
a memory communicatively coupled to the processor, the memory storing instructions causing the processor, after execution of the instructions by the processor, to:
display a reference page number with each displayed page of a digital document having reference page numbers, the digital document corresponding to a reference document having page numbers that correspond to the reference page numbers;
render the digital document based on the characteristics of the display that change the amount of content that can fit on the display; and
display a fractional page number with each displayed page of the digital document, each fractional page number corresponding to a portion of a page of the reference document, wherein the fractional page number is updated in response to the characteristics of the display being changed,
wherein the memory stores instructions causing the processor, after execution of the instructions by the processor, to:
based on the reference page numbers and fractional page numbers, determine print charges for the digital document, estimate bandwidth for transmitting the digital document, or determine the type of content of the digital document.

2. The device of claim 1, wherein the fractional page number comprises a numerator indicating the portion of the page of the reference document including content of the displayed page and a denominator indicating the number of pages of the digital document corresponding to the page of the reference document.

3. The device of claim 1, wherein the fractional page number comprises a decimal representation.

4. The device of claim 3, wherein the decimal representation is based on a count of characters for the text and an area for non-text objects and wherein each character and non-text object has an index computed during rendering of the digital document.

5. The device of claim 4, wherein the memory stores instructions to determine the print charges based on a per text page rate for the text and a per image page rate for non-text objects.

6. The device of claim 1, wherein the memory stores instructions causing the processor, after execution of the instructions by the processor, to:
display a range of reference page numbers and fractional page numbers with a displayed page corresponding to more than one page of the reference document.

7. A device comprising:
a display;
a processor; and
a memory communicatively coupled to the processor, the memory storing instructions causing the processor, after execution of the instructions by the processor, to:
retrieve a digital document including embedded reference page numbers that correspond to page numbers of a reference document corresponding to the digital document;
assign a fractional page number to each page to be rendered of the digital document based on characteristics of the display; and
render the digital document on the display including a reference page number and a fractional page number for each rendered page of the digital document such that the reference page number and the fractional page number indicate a portion of a page of the reference document, wherein to render the digital document is based on the characteristics of the display that change the amount of content that can fit on the display, and wherein the fractional page number is updated in response to the characteristics of the display being changed, and wherein the characteristics include at least one from the group of screen size, window size, font size, line spacing, form factor, and resolution.

8. The device of claim 7, wherein the memory stores instructions causing the processor, after execution of the instructions by the processor, to:

in response to a rendered page of the digital document corresponding to more than one page of the reference document, display a range of reference page numbers for the rendered page.

9. The device of claim 7, wherein each factional page number comprises a denominator indicating a number of pages to be rendered of the digital document corresponding to a page of the reference document and a numerator indicating the portion of the page of the reference document.

10. The device of claim 7, wherein each factional page number comprises a decimal representation indicating a portion of a page of the reference document.

11. The device of claim 10, wherein the decimal representation is based on a count of characters for the text and an area for non-text objects and wherein each character and non-text object has an index computed during rendering of the digital document.

12. The device of claim 7, wherein the memory stores instructions causing the processor, after execution of the instructions by the processor, to:

based on the reference page numbers and fractional page numbers, determine print charges for the digital document, estimate bandwidth for transmitting the digital document, or determine the type of content of the digital document.

13. The device of claim 12, wherein the memory stores instructions causing the processor, after execution of the instructions by the processor, to:

determine the print charges based on a per text page rate for text and a per image page rate for non-text objects.

14. A method for displaying a digital document, the method comprising:

retrieving, via a processing system, a digital document including embedded reference page numbers that correspond to page numbers of a reference document;

assigning, via the processing system, a factional page number to each page of the digital document to be rendered based on the characteristics of a display that change the amount of content that can fit on the display; and rendering, via the processing system, the digital document on the display including a reference page number and a fractional page number corresponding to each rendered page of a portion of a page of the reference document, wherein the fractional page number is updated in response to the characteristics of the display being changed, wherein the characteristics include at least one from the group of screen size, window size, font size, line spacing, form factor, and resolution.

15. The method of claim 14, further comprising:

updating, via the processing system, the rendered digital document on the display including a reference page number and updated factional page number corresponding to each rendered page.

16. The method of claim 14, wherein assigning fractional page numbers comprises assigning a denominator indicating a number of pages of the digital document to be rendered corresponding to a page of the reference document and a numerator indicating a portion of the page of the reference document.

17. The method of claim 14, wherein assigning fractional page numbers comprises assigning a decimal representation corresponding to a portion of a page of the reference document, wherein the decimal representation is based on a count of characters for the text and an area for non-text objects and wherein each character and non-text object has an index computed during rendering of the digital document.

18. The method of claim 14, further comprising:

assigning, via the processing system, a range of fractional page numbers to a page of the digital document to be rendered.

19. The method of claim 14, further comprising determining print charges for the digital document, estimate bandwidth for transmitting the digital document, or determine the type of content of the digital document based on the reference page numbers and fractional page numbers.

20. The method of claim 19, further comprising determining the print charges based on a per text page rate for the text and a per image page rate for non-text objects.

* * * * *